L. W. AUSTIN.

Assignor to the ALBERT FIELD TACK CO.

MANUFACTURE OF SHOE-NAILS.

No. 7,530. Reissued Feb. 27, 1877.

Witnesses,
W. J. Cambridge
Edward S. Winchester.

Inventor,
Lloyd W. Austin,
Per Teschemacher & Stearns,
Attorneys.

N. PETERS, PHOTO-LITHOGRAPHER, WASHINGTON, D. C.

UNITED STATES PATENT OFFICE

LLOYD W. AUSTIN, OF TAUNTON, MASSACHUSETTS, ASSIGNOR TO THE ALBERT FIELD TACK COMPANY.

IMPROVEMENT IN THE MANUFACTURE OF SHOE-NAILS.

Specification forming part of Letters Patent No. 181,619, dated August 29, 1876; reissue No. 7,530, dated February 27, 1877; application filed February 12, 1877.

*To all whom it may concern:*

Be it known that I, LLOYD W. AUSTIN, of Taunton, in the county of Bristol and State of Massachusetts, have invented an Improvement in Cutting Nail-Blanks, of which the following is a full, clear, and exact description, reference being had to the accompanying drawings, making part of this specification, in which—

Figure 1:
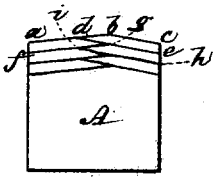
Figure 2:
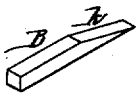
Figure 3:
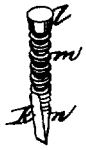

Figure 1 is a plan of a nail-plate illustrating the manner in which the blanks are cut therefrom. Fig. 2 is a perspective view (enlarged) of one of the blanks cut from the nail-plate. (Shown in Fig. 1.) Fig. 3 is a perspective view of a shoe-nail finished and ready for use, made from a blank cut after my method.

Blanks, such as are shown in Fig. 2, have heretofore been been cut from a nail-plate and finished into nails like that shown in Fig. 3; and my invention has for its object to facilitate the cutting of such blanks; and consists in cutting the blanks, in a peculiar manner, from a nail-plate, as now to be more fully described.

In the said drawings, A represents a square-edged nail-plate, from which the blanks B, Fig. 2, are cut in a suitable nail-machine in the following manner, the mechanism for feeding the plate being so constructed as to give the required movements thereto: The end of the plate A is first cut on the lines *a b c b*. A blank is then cut on the line *d e* on one side of the plate, which is afterward fed forward and moved laterally, or turned in such a manner as to cause the cutter to sever the next blank from the opposite side of the plate on the line *f g*, after which the plate is again fed forward and moved laterally, or turned so as to cause a third blank to be severed on the line *h i*, and so on until the plate is used up; and it will be seen that by this method each blank is cut with parallel sides and a chisel-shaped clinching-point, *k*, beveled on one side only, as seen in Fig. 2, this form being produced without any waste of stock whatever, except that occasioned by first cutting the plate on the lines *a b c b* and the usual butt or waste piece at the end of the plate.

Each blank, as it is severed from the plate, is seized and compressed by dies, which are so shaped as to form the head *l* and the notches or corrugations *m*, and also to bend the point so that its two opposite sides *k n* will be equally inclined to form a proper tapering point, as seen in Fig. 3.

A finished shoe-nail having untapered sides and a flat or chisel-shaped clinching-point can thus be easily and cheaply produced by cutting from a plate.

I do not, however, claim either the blank or the nail as of my invention; but only the mode of cutting the blanks, which is far superior to any other method known to me.

What I claim as my invention, and desire to secure by Letters Patent, is—

The within-described improvement in the art of cutting blanks for nails, consisting in cutting the plate on the inclined lines, as and for the purpose specified.

Witness my hand this 2d day of February, A. D. 1877.

LLOYD W. AUSTIN.

In presence of—

GEO. F. HOWARD,

OTIS ALLEN.